(12) United States Patent
Nie

(10) Patent No.: US 11,156,880 B2
(45) Date of Patent: Oct. 26, 2021

(54) DISPLAY PANEL AND DISPLAY DEVICE

(71) Applicant: WUHAN CHINA STAR OPTOELECTRONICS TECHNOLOGY CO., LTD., Wuhan (CN)

(72) Inventor: Xiaohui Nie, Wuhan (CN)

(*) Notice: Subject to any disclaimer, the term of this patent is extended or adjusted under 35 U.S.C. 154(b) by 163 days.

(21) Appl. No.: 16/331,156

(22) PCT Filed: Jan. 16, 2019

(86) PCT No.: PCT/CN2019/071890
§ 371 (c)(1),
(2) Date: Mar. 7, 2019

(87) PCT Pub. No.: WO2020/107679
PCT Pub. Date: Jun. 4, 2020

(65) Prior Publication Data
US 2021/0181558 A1    Jun. 17, 2021

(30) Foreign Application Priority Data

Nov. 29, 2018 (CN) .......................... 201811442661.4

(51) Int. Cl.
*G02F 1/1339* (2006.01)
*G02F 1/1333* (2006.01)
*G02F 1/1335* (2006.01)

(52) U.S. Cl.
CPC .... *G02F 1/13398* (2021.01); *G02F 1/133345* (2013.01); *G02F 1/133368* (2021.01); *G02F 1/133512* (2013.01)

(58) Field of Classification Search
None
See application file for complete search history.

(56) References Cited

U.S. PATENT DOCUMENTS 6,317,187 B1* 11/2001 Nakajima ........... G02F 1/13394
349/155
2012/0327347 A1* 12/2012 Cho ...................... G02F 1/1339
349/138

FOREIGN PATENT DOCUMENTS

| CN | 106054465 A | 10/2016 |
| CN | 107290901 A | 10/2017 |
| CN | 107565058 A | 1/2018 |

* cited by examiner

*Primary Examiner* — Phu Vu

(57) ABSTRACT

The present invention provides a display panel and a display device. Within a bezel region, the display panel includes a first substrate and a second substrate arranged corresponding to each other. A protrusion is placed on a first surface of the first substrate, which faces the second substrate. The display panel also includes a sealing adhesive filled in a gap between the first substrate and the second substrate. Because of the protrusion, a contact area between the first substrate and the sealing adhesive is increased, a longer path for entry of moisture is created, and the display panel, such as a liquid crystal display, has a better waterproofing.

10 Claims, 2 Drawing Sheets

DISPLAY PANEL AND DISPLAY DEVICE

1. FIELD OF DISCLOSURE

The present invention relates to a field of display devices and in particular, to a display panel and a display device.

2. DESCRIPTION OF RELATED ART

As shown in FIG. 1, a conventional display panel, such as a liquid crystal display panel, includes, within a bezel region of the display panel, a first substrate 11, a second substrate 12, and a sealing adhesive 13 for filling and sealing. A path for entry of moisture is generally along a contact surface S11 between the first substrate 11 and the sealing adhesive 13 and along a contact surface S12 between the second substrate 12 and the sealing adhesive 13.

The conventional contact surface S11 and the conventional contact surface S12 are generally planar, so a path for entry of moisture is short, and as a result, a conventional display panel, such as a liquid crystal display panel, provides poor waterproofing.

SUMMARY

The present application provides a display panel and a display device to improve the technical problem of poor waterproofing of conventional display panels.

Accordingly, the present invention provides a technical solution as follows.

The present invention provides a display panel, wherein within a bezel region of the display panel, the display panel comprises:

a first substrate and a second substrate arranged corresponding to each other, a protrusion being disposed on a first surface of the first substrate, which faces the second substrate; and a sealing adhesive filled in a gap between the first substrate and the second substrate.

In the display panel of the present invention, a recess is defined in a second surface of the second substrate, which faces the first substrate.

In the display panel of the present invention, the protrusion is disposed corresponding to the recess.

In the display panel of the present invention, a thickness of the protrusion is greater than a spacing between the first substrate and the second substrate.

In the display panel of the present invention, the display panel comprises two recesses.

In the display panel of the present invention, the display panel comprises two protrusions.

In the display panel of the present invention, the protrusions have a same thickness.

In the display panel of the present invention, the protrusion is made of a light shielding material.

In the display panel of the present invention, a cross-section of the protrusion is trapezoid in shape.

In the display panel of the present invention, a side surface of the protrusion is sawtooth shaped.

The present invention further provides a display device, the display device comprising a display panel and a backlight source, wherein within a bezel region of the display panel, the display panel comprises:

a first substrate and a second substrate arranged corresponding to each other, a protrusion being disposed on a first surface of the first substrate, which faces the second substrate; and a sealing adhesive filled in a gap between the first substrate and the second substrate.

In the display device of the present invention, a recess is defined in a second surface of the second substrate, which faces the first substrate.

In the display device of the present invention, the protrusion is disposed corresponding to the recess.

In the display device of the present invention, a thickness of the protrusion is greater than a spacing between the first substrate and the second substrate.

In the display device of the present invention, the display device comprises two recesses.

In the display device of the present invention, the display device comprises two protrusions.

In the display device of the present invention, the protrusions have a same thickness.

In the display device of the present invention, the protrusion is made of a light shielding material.

In the display device of the present invention, a cross-section of the protrusion is trapezoid in shape.

In the display device of the present invention, a side surface of the protrusion is sawtooth shaped.

The beneficial effects of the application:

The present invention provides a display panel and a display device. Within a bezel region of the display panel, the display panel comprises: a first substrate and a second substrate arranged corresponding to each other, a protrusion being disposed on a first surface of the first substrate, which faces the second substrate; and a sealing adhesive filled in a gap between the first substrate and the second substrate. Due to the protrusion, a contact area between the first substrate and the sealing adhesive is increased, a longer path for entry of moisture is created, and waterproofing of the display panel such as a liquid crystal display panel is improved, thus overcoming a problem of poor waterproofing of conventional display panels.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

Embodiments of the present disclosure are described in detail with reference to the accompanying drawings as follows. Directional terms such as up/down, right/left and the like may be used for the purpose of enhancing a reader's understanding about the accompanying drawings, but are not intended to be limiting. Specifically, the terminologies in the embodiments of the present disclosure are merely for the purpose of describing certain embodiments, but not intended to limit the scope of the invention. The same reference numbers are used throughout the drawings to refer to the same or similar parts.

Conventional display panels, such as liquid crystal display panels, have poor waterproofing. The present invention can improve the problem.

Figure 1:
FIG. 1 is a schematic cross-sectional view illustrating a conventional display panel.
Figure 2:
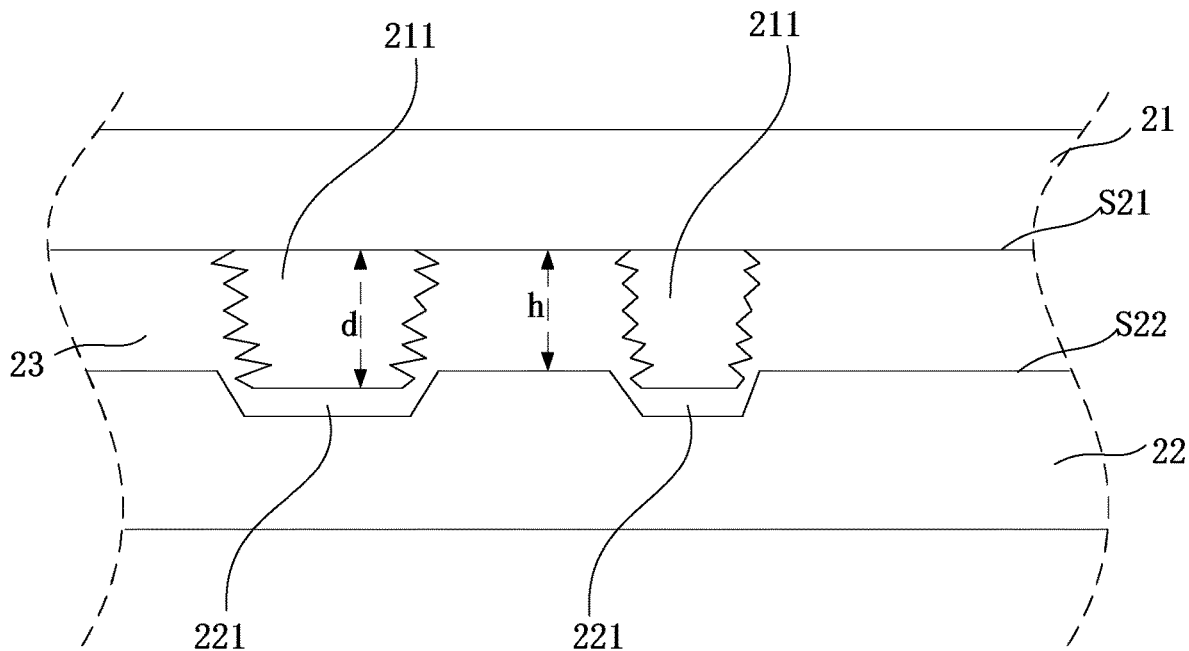
FIG. 2 is a schematic diagram illustrating a first kind of a cross-sectional view of a display panel according to one embodiment of the present invention.

As shown in FIG. 2, according to one embodiment of the present invention, a display panel 2 is provided, wherein within a bezel region of the display panel 2, the display panel 2 comprises: a first substrate 21 and a second substrate 22 arranged corresponding to each other, a protrusion 211 is disposed on a first surface S21 of the first substrate 21, which faces the second substrate 22; and a sealing adhesive 23 filled in a gap between the first substrate 21 and the second substrate 22.

According to the present embodiment, within the bezel region of the display panel 2, the display panel 2 comprises: the first substrate 21 and the second substrate 22 arranged corresponding to each other, the protrusion 211 being disposed on the first surface S21 of the first substrate 21, which faces the second substrate 22; and the sealing adhesive 23 filled in the gap between the first substrate 21 and the second substrate 22. Due to the protrusion 211, a contact area between the first substrate 21 and the sealing adhesive 23 is increased, a path for entry of moisture is longer, and waterproofing of the display panel 2, such as a liquid crystal display panel, is improved, thus overcoming poor waterproofing problems of conventional display panels.

According to one embodiment of the present invention, the sealing adhesive is a sealant.

As shown in FIG. 2, according to one embodiment of the present invention, a recess 221 is defined in a second surface S22 of the second substrate 22, which faces the first substrate 21.

As shown in FIG. 2, according to one embodiment of the present invention, the protrusion 211 is disposed corresponding to the recess 221.

According to one embodiment of the present invention, the protrusion 211 and the recess 221 are alternately arranged.

As shown in FIG. 2, according to one embodiment of the present invention, a thickness d of the protrusion 211 is greater than a spacing h between the first substrate 21 and the second substrate 22.

As shown in FIG. 2, according to one embodiment of the present invention, the display panel 2 comprises two recesses 221. The two recesses 221 are, for example, two recesses which completely surround a display region.

According to one embodiment of the present invention, the recesses 221 comprise multiple sub-recesses arranged discontinuously.

As shown in FIG. 2, according to one embodiment of the present invention, the display panel 2 comprises two protrusions 211. The two protrusions 211 are, for example, two protrusions which continuously surround the display region.

As shown in FIG. 2, according to one embodiment of the present invention, the protrusions 211 comprise multiple sub-protrusions arranged discontinuously.

According to one embodiment of the present invention, the sub-protrusions and the sub-recesses are alternately arranged.

As shown in FIG. 2, according to one embodiment of the present invention, the protrusions 211 have a same thickness, thus simplifying a manufacturing process.

According to one embodiment of the present invention, the protrusion 211 is made of a light shielding material.

As shown in FIG. 2, according to one embodiment of the present invention, a cross-section of the protrusion 211 is trapezoid in shape.

As shown in FIG. 2, according to one embodiment of the present invention, a side surface of the protrusion 211 has a sawtooth shape.

According to one embodiment of the present invention, a cross-section of the protrusion 211 is rectangular in shape.

According to one embodiment of the present invention, a side surface of the protrusion 211 is stepped shape.

According to one embodiment of the present invention, the first substrate 21 is provided with a plurality of protrusions and a plurality of recesses at the same time, and the second substrate 22 is provided with a plurality of protrusions and a plurality of recesses at the same time, and the protrusions and the recesses of the first substrate 21 are alternately arranged. The protrusions and the recesses of the second substrate 22 are alternately arranged.

According to one embodiment of the present invention, the protrusions on the first substrate 21 and the recesses in the second substrate 22 are disposed corresponding to each other, and the recesses in the first substrate 21 and the protrusions on the second substrate 22 are disposed corresponding to each other.

According to one embodiment of the present invention, the first substrate 21 is one of a color filter substrate and an array substrate, and the second substrate 22 is the other one of the color filter substrate and the array substrate, which is not used as the first substrate 21.

The present invention will be further described using an example in which the first substrate is a color filter substrate, and the second substrate is an array substrate.

Figure 3:
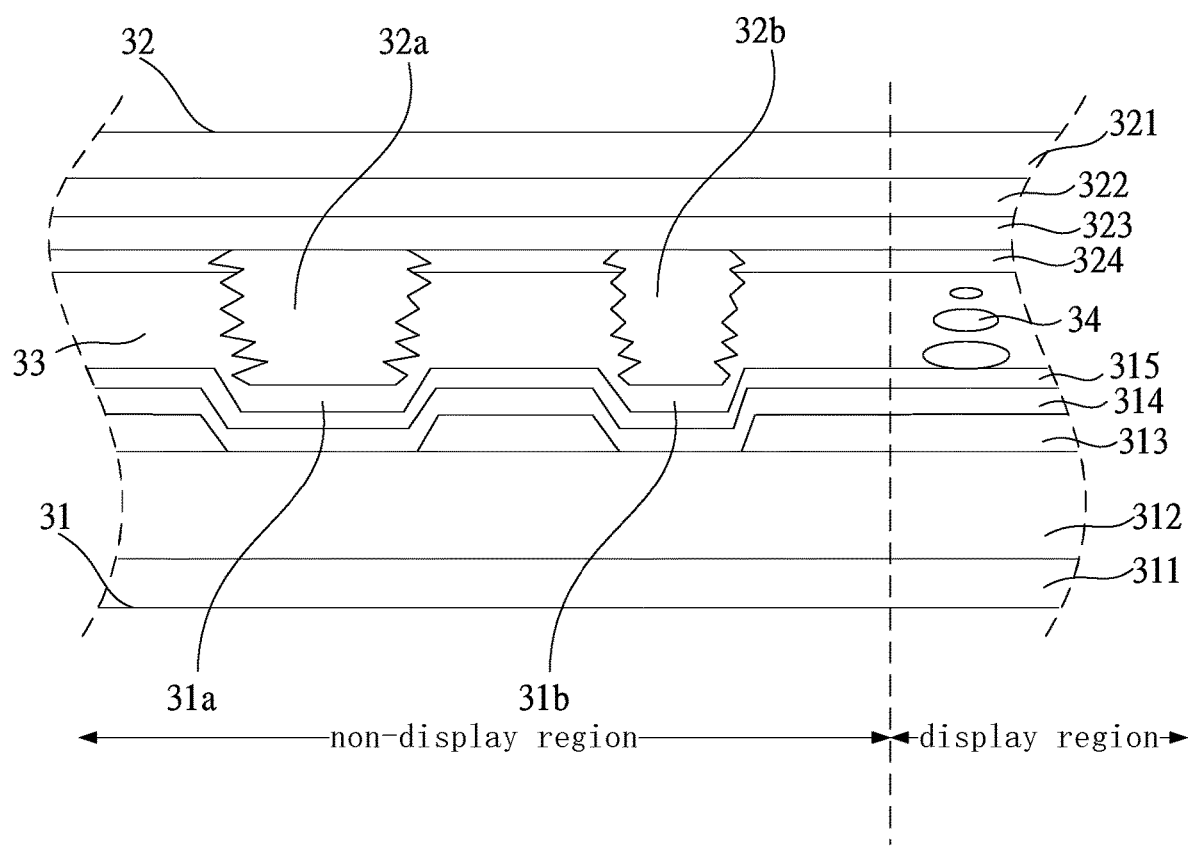
FIG. 3 is a schematic diagram illustrating a second kind of a cross-sectional view of the display panel according to one embodiment of the present invention.

As shown in FIG. 3, a liquid crystal display panel includes an array substrate (i.e., a thin film transistor (TFT) substrate) 31 and a color filter substrate (i.e., a color filter (CF) substrate) 32, a sealant 33 is applied to a non-display region NA (including a bezel region) of the CF substrate, and liquid crystals 34 are coated in a display region AA of the TFT substrate.

The array substrate 31 comprises a glass substrate 311, a circuit function layer (the circuit function layer comprises a multilayered metal layer forming a TFT circuit, an insulating layer, and etc.) 312, a planarization (PLN) layer 313, and a passivation (PV) layer 314, and a polyimide or polyimide alignment (PI) layer 315. The color filter substrate 32 comprises a glass substrate 321, a black matrix (BM) layer 322, an over coating (OC) layer 323, and a polyimide or polyimide alignment (PI) layer 324.

In the present embodiment, in order to improve a sealing property for panel packaging, the non-display region NA of the TFT substrate is disposed corresponding to the sealant 33 of the CF substrate. Two PLN recesses, i.e. recesses 31a and 31b, are formed in the PLN layer 313 by using a process such as a yellow light process, so that a fill amount of the sealant 33 is increased, and a longer path for entry of moisture is created to prevent entry of the moisture. Two pillar-like BM portions, 32a and 32b (i.e. the protrusions mentioned above) are disposed on the CF substrate and arranged in positions corresponding to the PLN recesses, 31a and 31b. The BM portions 32a and 32b are matched in size to the PLN recesses 31a and 31b to ensure close fitting. The pillar-like BM portions 32a and 32b have a sawtooth-shaped design on two sides thereof to increase a contact area with the sealant 33, so a longer path for entry of moisture is created, and sealing properties and reliability of liquid crystal display (LCD) panels are improved.

The present invention provides a display device. The display device comprises the display panel shown in FIG. 2 and a backlight source. Within a bezel region of the display panel, the display panel comprises:

a first substrate 21 and a second substrate 22 arranged corresponding to each other, a protrusion 211 being disposed on a first surface S21 of the first substrate 21, which faces the second substrate 22; and a sealing adhesive 23 filled in a gap between the first substrate 21 and the second substrate 22 for a sealing purpose.

As shown in FIG. 2, according to one embodiment of the present invention, a recess is defined in a second surface S22 of the second substrate 22, which faces the first substrate 21.

As shown in FIG. 2, according to one embodiment of the present invention, the protrusion 211 is disposed corresponding to the recess 221.

As shown in FIG. 2, according to one embodiment of the present invention, a thickness d of the protrusion 211 is greater than a spacing h between the first substrate 21 and the second substrate 22.

As shown in FIG. 2, according to one embodiment of the present invention, the display device comprises two recesses 221. The two recesses 221 are, for example, two recesses which completely surround a display region.

As shown in FIG. 2, according to one embodiment of the present invention, the display device comprises two protrusions 211. The two protrusions 211 are, for example, two protrusions which continuously surround the display region.

As shown in FIG. 2, according to one embodiment of the present invention, the protrusions 211 comprise multiple sub-protrusions arranged discontinuously.

According to one embodiment of the present invention, the sub-protrusions and sub-recesses are alternately arranged.

As shown in FIG. 2, according to one embodiment of the present invention, the protrusions 211 have a same thickness, thus simplifying a manufacturing process.

According to one embodiment of the present invention, the protrusion 211 is made of a light shielding material.

As shown in FIG. 2, according to one embodiment of the present invention, a cross-section of the protrusion 211 is of a trapezoid shape.

As shown in FIG. 2, according to one embodiment of the present invention, a side surface of the protrusion 211 is of a sawtooth shape.

According to one embodiment of the present invention, the first substrate 21 is provided with a plurality of protrusions and a plurality of recesses at the same time, and the second substrate 22 is provided with a plurality of protrusions and a plurality of recesses at the same time, and the protrusions and the recesses of the first substrate 21 are alternately arranged. The protrusions and the recesses of the second substrate 22 are alternately arranged.

According to one embodiment of the present invention, the protrusions on the first substrate 21 and the recesses in the second substrate 22 are disposed corresponding to each other, and the recesses in the first substrate 21 and the protrusions on the second substrate 22 are disposed corresponding to each other.

According to one embodiment of the present invention, the first substrate 21 is one of a color filter substrate and an array substrate, and the second substrate 22 is the other one of the color filter substrate and the array substrate, which is not used as the first substrate 21.

The beneficial effects of the application:

The present invention provides a display panel and a display device. Within a bezel region of the display panel, the display panel comprises: a first substrate and a second substrate arranged corresponding to each other, a protrusion being disposed on a first surface of the first substrate, which faces the second substrate; and a sealing adhesive filled in a gap between the first substrate and the second substrate. Due to the protrusion, a contact area between the first substrate and the sealing adhesive is increased, a longer path for entry of moisture is created, and waterproofing of the display panel, such as a liquid crystal display panel, is improved, thus overcoming poor waterproofing problems in conventional display panels.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A display panel, wherein within a bezel region of the display panel, the display panel comprises:
   a first substrate and a second substrate arranged corresponding to each other, the first substrate comprising a surface, a protrusion disposed on the surface of the first substrate, the second substrate comprises a surface, the surface of the first substrate facing the surface of the second substrate, wherein a recess is defined in the surface of the second substrate and faces the first substrate, the protrusion is disposed corresponding to the recess, the first substrate is separated from the second substrate by a distance, a thickness of the protrusion is greater than the distance, the protrusion is made of a light shielding material, and an entire length of each of at least one side surface of the protrusion is distributed with sawtooth shaped portions; and
   a sealing adhesive filled in a gap between the first substrate and the second substrate, the sealing adhesive contacting the protrusion.

2. The display panel according to claim 1, wherein the display panel comprises two recesses.

3. The display panel according to claim 1, wherein the display panel comprises two protrusions.

4. The display panel according to claim 3, wherein the protrusions have a same thickness.

5. The display panel according to claim 1, wherein a cross-section of the protrusion is trapezoid in shape.

6. A display device, the display device comprising a display panel and a backlight source, wherein within a bezel region of the display panel, the display panel comprises:
   a first substrate and a second substrate arranged corresponding to each other, the first substrate comprising a surface. a protrusion disposed on the surface of the first substrate, the second substrate comprises a surface, the surface of the first substrate facing the surface of the second substrate, wherein a recess is defined in the surface of the second substrate and faces the first substrate, the protrusion is disposed corresponding to the recess, the first substrate is separated from the second substrate by a distance, a thickness of the protrusion is greater than the distance. the protrusion is made of a light shielding material, and an entire length of each of at least one side surface of the protrusion is distributed with sawtooth shaped portions; and
   a sealing adhesive filled in a gap between the first substrate and the second substrate, the sealing adhesive contacting the protrusion.

7. The display device according to claim 6, wherein the display-device comprises two recesses.

8. The display device according to claim 6, wherein the display device comprises two protrusions.

9. The display device according to claim 8, wherein the protrusions have a same thickness.

10. The display device according to claim 6, wherein a cross-section of the protrusion is trapezoid in shape.

* * * * *